United States Patent
Kanamaru et al.

(10) Patent No.: US 11,531,399 B2
(45) Date of Patent: Dec. 20, 2022

(54) ELECTRONIC APPARATUS

(71) Applicant: Mitsubishi Electric Corporation, Tokyo (JP)

(72) Inventors: Masahiro Kanamaru, Tokyo (JP); Fuqiang Han, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/420,864

(22) PCT Filed: Feb. 8, 2019

(86) PCT No.: PCT/JP2019/004643
§ 371 (c)(1),
(2) Date: Jul. 6, 2021

(87) PCT Pub. No.: WO2020/161892
PCT Pub. Date: Aug. 13, 2020

(65) Prior Publication Data
US 2022/0066559 A1 Mar. 3, 2022

(51) Int. Cl.
*G06F 3/01* (2006.01)
*G06F 3/041* (2006.01)

(52) U.S. Cl.
CPC ............ *G06F 3/016* (2013.01); *G06F 3/0412* (2013.01)

(58) Field of Classification Search
None
See application file for complete search history.

(56) References Cited

U.S. PATENT DOCUMENTS

| 2019/0004566 A1* | 1/2019 | Lee | H04R 9/025 |
| 2020/0077199 A1* | 3/2020 | Wilk | H04R 9/04 |

FOREIGN PATENT DOCUMENTS

| JP | 61-28296 A | 2/1986 |
| JP | 5-23785 U | 3/1993 |
| JP | 2003-211087 A | 7/2003 |

OTHER PUBLICATIONS

International Search Report for PCT/JP2019/004643 filed Feb. 8, 2019 dated Mar. 19, 2019.
Japanese Office Action for Japanese Application No. 2020-570317, dated Sep. 21, 2021, with English translation.

* cited by examiner

*Primary Examiner* — Brian M Butcher
(74) *Attorney, Agent, or Firm* — Birch, Stewart, Kolasch & Birch, LLP

(57) ABSTRACT

A touch panel including an operation surface on which touch operation is to be performed; a voice coil actuator to apply vibrating force to the operation surface in response to the touch operation; and a main body chassis supporting the touch panel via a spring are included, and the voice coil actuator includes: a magnetic circuit unit provided on the main body chassis and including a magnetic gap; a coil unit provided on a rear surface of the touch panel and including a coil provided in the magnetic gap; and a fit unit to align a center position of the coil unit and a center position of the magnetic circuit unit and with each other by fitting the coil unit and the magnetic circuit unit and to each other when the coil unit is pushed toward the magnetic circuit unit.

1 Claim, 4 Drawing Sheets

ELECTRONIC APPARATUS

TECHNICAL FIELD

The present invention relates to an electronic apparatus in which a touch panel is supported to be capable of being vibrated.

BACKGROUND ART

An electronic apparatus has conventionally been provided that has a function of feeding back vibration to a fingertip of a user in response to the user's touch operation. In the electronic apparatus, a touch panel is supported to be capable of being vibrated, and an actuator is included for applying vibrating force to the touch panel. As such an actuator for the electronic apparatus, a voice coil actuator is often adopted.

The voice coil actuator includes a magnetic circuit unit on a fixed side and a coil unit on a movable side, and vibrates the coil unit with respect to the magnetic circuit unit by generating a magnetic field between the magnetic circuit unit and the coil unit. Furthermore, the voice coil actuator is also adopted as an actuator of a speaker. Then, as such a conventional voice coil actuator, for example, one is disclosed in Patent Literature 1.

CITATION LIST

Patent Literature

Patent Literature 1: JP S61-28296 A

SUMMARY OF INVENTION

Technical Problem

The conventional voice coil actuator is an outer magnet type voice coil actuator in which a magnet of the magnetic circuit unit is disposed on the outer side from a coil of the coil unit. In general, in the outer magnet type voice coil actuator, by disposing the magnet on the outer side from the coil, it is possible to increase the size of the magnet, thereby increase the cross-sectional area of the magnet, and thereby increase magnetic flux density in the magnetic circuit unit. The magnitude of the vibrating force exerted by the voice coil actuator is proportional to the magnetic flux density level.

Furthermore, in order for the voice coil actuator to efficiently exert the vibrating force, it is necessary to narrow a gap between a yoke and a pole in the magnetic circuit unit to increase the magnetic flux density, and position the coil in the gap with high accuracy. At this time, when the positioning accuracy of the magnetic circuit unit with respect to the coil unit is insufficient, there is a possibility that the yoke and pole of the magnetic circuit unit come into contact with the coil of the coil unit, and thereby the voice coil actuator is damaged.

The present invention has been made to solve the problem described above, and it is an object to provide an electronic apparatus capable of obtaining vibrating force at a required magnetic flux density level by performance of positioning of a coil unit with respect to a magnetic circuit unit.

Solution to Problem

An electronic apparatus according to the present invention includes: a panel including an operation surface on which touch operation is to be performed; an actuator to apply vibrating force to the operation surface in response to the touch operation; and a fixed member supporting the panel via an elastic member, in which the actuator includes: a magnetic circuit unit provided on the fixed member and including a magnetic gap having an annular shape; a coil unit provided on a rear surface of the panel and including a coil which has a cylindrical shape and which is provided in the magnetic gap; and a fit unit to align a center position of the magnetic circuit unit and a center position of the coil unit with each other by fitting the magnetic circuit unit and the coil unit to each other when the coil unit is pushed toward the magnetic circuit unit.

Advantageous Effects of Invention

According to the present invention, it is possible to obtain the vibrating force at a required magnetic flux density level by performing positioning of the coil unit with respect to the magnetic circuit unit.

BRIEF DESCRIPTION OF DRAWINGS

FIG. 4 is a set of diagrams illustrating a protrusion-recess fitting structure of the electronic apparatus according to the first embodiment.

DESCRIPTION OF EMBODIMENTS

Hereinafter, to explain the present invention in more detail, embodiments for carrying out the present invention will be described with reference to the accompanying drawings.

First Embodiment

Figure 1:
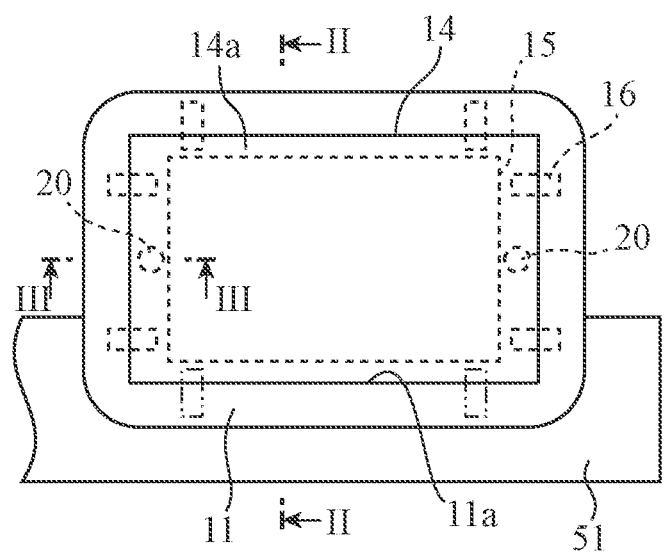
FIG. 1 is a front view of an electronic apparatus according to a first embodiment.
Figure 2:
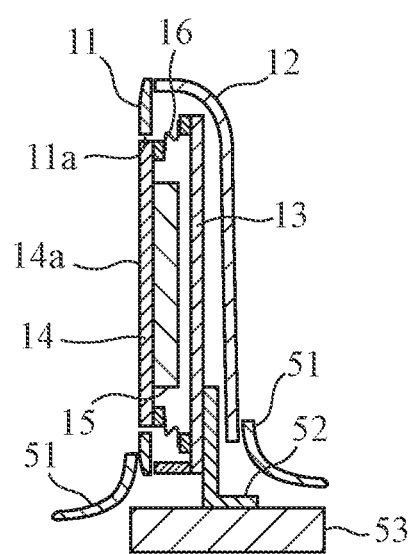
FIG. 2 is a cross-sectional arrow view taken along the line II-II of FIG. 1.
Figure 3:
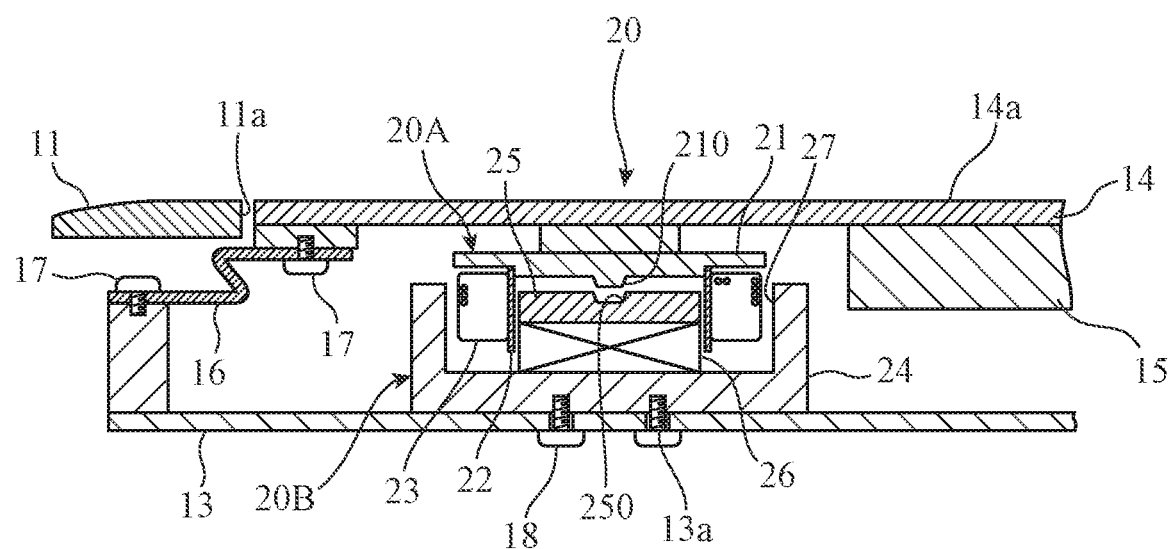
FIG. 3 is a cross-sectional arrow view taken along the line of FIG. 1.

First, a configuration of an electronic apparatus according to a first embodiment will be described with reference to FIGS. 1 to 3. FIG. 1 is a front view of the electronic apparatus according to the first embodiment. FIG. 2 is a cross-sectional arrow view taken along the line II-II of FIG. 1. FIG. 3 is a cross-sectional arrow view taken along the line of FIG. 1.

The electronic apparatus according to the first embodiment is an in-vehicle device installed in a vehicle, and has a function of feeding back vibration to a fingertip of a user in response to the user's touch operation. The electronic apparatus includes a front design panel 11, a rear design panel 12, a main body chassis 13, a touch panel 14, a liquid crystal panel 15, springs 16, and voice coil actuators 20. On the other hand, a vehicle interior of the vehicle is provided with a vehicle panel 51, a mounting plate 52, and a vehicle fixing part 53.

The front design panel 11 and the rear design panel 12 constitute an outer shell of the electronic apparatus and are joined to each other. The front design panel 11 is disposed at the front of the electronic apparatus and has a rectangular frame shape. The front design panel 11 includes an opening 11a having a rectangular shape. The rear design panel 12 is disposed at the rear of the electronic apparatus and has a rectangular plate shape. Then, a lower edge portion of the front design panel 11 and a lower edge portion of the rear design panel 12 are covered by the vehicle panel 51 from the outer side and fixed to the vehicle panel 51.

The main body chassis 13, the touch panel 14, the liquid crystal panel 15, the springs 16, and the voice coil actuators 20 are provided in an internal space formed by mounting the front design panel 11 and the rear design panel 12 on each other. Among these, the main body chassis 13 is fixed to the vehicle fixing part 53 via the mounting plate 52. The main body chassis 13 constitutes a fixed member.

Both the touch panel 14 and the liquid crystal panel 15 have a rectangular shape, and the touch panel 14 is a panel larger than the liquid crystal panel 15. Then, the rear surface of the touch panel 14 and the front surface of the liquid crystal panel 15 are bonded to each other. At this time, the liquid crystal panel 15 is located in a central portion of the touch panel 14, and the liquid crystal panel 15 is not bonded to an outer peripheral edge portion on the rear surface of the touch panel 14.

The touch panel 14 is housed in the opening 11a of the front design panel 11 in a state of being bonded to the liquid crystal panel 15. The front surface of the touch panel 14 is exposed from the opening 11a of the front design panel 11 and faces forward, and forms an operation surface 14a. The operation surface 14a accepts the touch operation from the user.

The springs 16 are connected in a bent state at a plurality of locations between the front surface of the main body chassis 13 and the outer peripheral edge portion on the rear surface of the touch panel 14. Both ends of the spring 16 are fixed with use of screws 17. As a result, the touch panel 14 is supported with utilization of elastic force of the spring 16 to be capable of being vibrated with respect to the main body chassis 13. That is, the touch panel 14 is in a floating state with respect to the main body chassis 13. Note that, the spring 16 constitutes an elastic member.

A plurality of the voice coil actuators 20 is provided between the front surface of the main body chassis 13 and the outer peripheral edge portion on the rear surface of the touch panel 14. The voice coil actuators 20 illustrated in FIGS. 1 and 3 are provided on only the left and right peripheral edge portions on the rear surface of the touch panel 14; however, in addition to this, the voice coil actuators 20 may be provided on the upper and lower peripheral edge portions on the rear surface. Furthermore, the voice coil actuators 20 may be provided on only the upper and lower peripheral edge portions on the rear surface of the touch panel 14. That is, the number and positions of the voice coil actuators 20 can be adjusted as appropriate.

Moreover, the voice coil actuator 20 has a circular outer shape, and includes a coil unit 20A and a magnetic circuit unit 20B. The coil unit 20A and the magnetic circuit unit 20B are arranged coaxially. Then, the coil unit 20A is bonded to the outer peripheral edge portion on the rear surface of the touch panel 14. On the other hand, the magnetic circuit unit 20B is fixed to the front surface of the main body chassis 13.

The coil unit 20A includes a pusher 21, a coil bobbin 22, and a coil 23. The pusher 21 has a circular shape, and the front surface of the pusher 21 is bonded to the rear surface of the touch panel 14. Furthermore, the pusher 21 includes a fit protrusion 210. The fit protrusion 210 is provided at a central portion of the rear surface of the pusher 21, and protrudes rearward from the rear surface. The coil bobbin 22 has a cylindrical shape and is provided on the rear surface of the pusher 21. The coil 23 serves as a vibration source for the voice coil actuator 20, and is wound around the outer peripheral surface of the coil bobbin 22.

The magnetic circuit unit 20B includes a yoke 24, a pole 25, a magnet 26, and a magnetic gap 27. The yoke 24 and the pole 25 are each made of a magnetic material.

The yoke 24 includes a bottom plate portion having a circular shape and a cylindrical portion. The bottom plate portion of the yoke 24 is fixed to the front surface of the main body chassis 13 with use of screws 18. The screws 18 are fastened to the bottom plate portion of the yoke 24 from the rear of the main body chassis 13 penetrating through holes 13a formed in the main body chassis 13.

The pole 25 and the magnet 26 each have a circular shape, and are arranged to be coaxially overlapped with each other in the cylindrical portion of the yoke 24. The magnet 26 is provided on the bottom surface of the yoke 24, and the pole 25 is provided on the front surface of the magnet 26. Note that, the outer diameter of the pole 25 is greater than or equal to the outer diameter of the magnet 26.

Furthermore, the pole 25 includes a fit recess 250. The fit recess 250 is provided at a central portion of the front surface of the pole 25, and is dented rearward from the front surface. As a result, the fit protrusion 210 and the fit recess 250 can be fitted to each other. Note that, the fit protrusion 210 and the fit recess 250 constitute a fit unit. Details of the fit unit will be described later with reference to FIG. 4.

Then, the magnetic gap 27 having an annular shape is formed between the inner peripheral surface of the cylindrical portion of the yoke 24 and the outer peripheral surface of the pole 25. On the other hand, the coil 23 wound around the outer peripheral surface of the coil bobbin 22 is disposed in the magnetic gap 27. As a result, the magnet 26 is disposed inside the coil 23. As described above, the voice coil actuator 20 has a configuration in which the magnet 26 is disposed inside the coil 23, thereby being an inner magnet type voice coil actuator.

Thus, in the voice coil actuator 20, due to interaction between an oscillating current supplied to the coil 23 and magnetic flux flowing from the pole 25 toward the yoke 24 in the magnetic gap 27, the coil 23 vibrates in the axial direction of the coil unit 20A integrally with the coil bobbin 22. Then, the vibration generated by the voice coil actuator 20 is transmitted to the touch panel 14.

Here, a predetermined amount of gap is provided between the rear surface of the pusher 21 and the front surface of the pole 25 in the front-rear direction. The gap has a space in which the rear surface of the pusher 21 and the front surface of the pole 25 do not come into contact with each other even if the coil unit 20A vibrates. As a result, the fit protrusion 210 and the fit recess 250 do not come into contact with each other even if the coil unit 20A vibrates.

That is, the front design panel 11, the rear design panel 12, the main body chassis 13, and the magnetic circuit unit 20B are fixed portions fixed to the vehicle among the members constituting the electronic apparatus. On the other hand, the touch panel 14, the liquid crystal panel 15, and the coil unit 20A are movable portions supported by the spring 16 to be capable of being vibrated with respect to the fixed portions.

Furthermore, in the electronic apparatus according to the first embodiment, at the time of manufacturing the electronic apparatus, the fit protrusion 210 of the pusher 21 and the fit recess 250 of the pole 25 are fitted to each other in the front-rear direction of the electronic apparatus, whereby a center position of the coil unit 20A and a center position of the magnetic circuit unit 20B are aligned with each other. Then, in the electronic apparatus according to the first embodiment, positioning of the coil unit 20A with respect to the magnetic circuit unit 20B in the voice coil actuator 20 is performed in a state where the coil unit 20A and the magnetic circuit unit 20B are arranged coaxially as described above. As a result, in the electronic apparatus according to the first embodiment, the magnetic gap 27 having an annular shape can be held with a uniform width over the entire circumference.

Figure 4A:
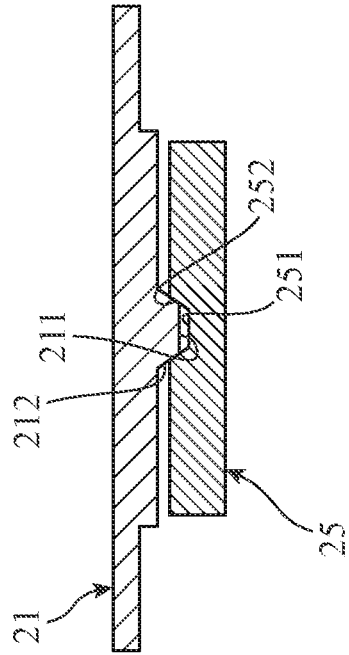
FIG. 4A is a diagram illustrating a state before fitting of a fit unit.
Figure 4B:
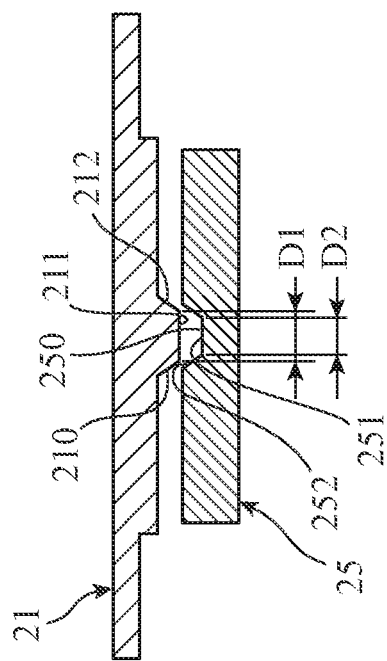
FIG. 4B is a diagram illustrating a state after fitting of the fit unit.

Next, the protrusion-recess fitting structure of the electronic apparatus according to the first embodiment will be described with reference to FIG. 4. FIG. 4A is a diagram illustrating a state before fitting of the fit unit. FIG. 4B is a diagram illustrating a state after fitting of the fit unit.

The fit protrusion 210 of the pusher 21 protrudes in a tapered shape. The fit protrusion 210 includes a protrusion surface 211 and an outer peripheral inclined surface 212. The protrusion surface 211 forms a top surface protruding most in the fit protrusion 210. The outer peripheral inclined surface 212 is a so-called tapered surface, and is formed around the protrusion surface 211.

The fit recess 250 of the pole 25 is dented in a tapered shape. The fit recess 250 includes a recess surface 251 and an inner peripheral inclined surface 252. The recess surface 251 forms a bottom surface dented most in the fit recess 250. The inner peripheral inclined surface 252 is a so-called inner diameter tapered surface, and is formed around the recess surface 251.

At this time, a diameter D1 of the protrusion surface 211 is greater than or equal to a diameter D2 of the recess surface 251. That is, the protrusion surface 211 and the recess surface 251 have a relationship in which D1≥D2. Furthermore, an inclination angle of the outer peripheral inclined surface 212 with respect to the rear surface of the pusher 21 and an inclination angle of the inner peripheral inclined surface 252 with respect to the front surface of the pole 25 are the same inclination angle. As a result, in the coil unit 20A and the magnetic circuit unit 20B, at the time of fitting, the outer peripheral inclined surface 212 and the inner peripheral inclined surface 252 come into contact with each other and thereby guide each other toward the center, so that the center positions can be aligned with each other more reliably. As a result, in the electronic apparatus according to the first embodiment, positioning of the coil unit 20A with respect to the magnetic circuit unit 20B in the voice coil actuator 20 can be performed with high accuracy.

Next, a method for manufacturing the electronic apparatus according to the first embodiment will be described with reference to FIGS. 1 to 4.

First, the rear surface of the touch panel 14 and the front surface of the liquid crystal panel 15 are bonded to each other. Furthermore, one end of the spring 16 is fixed to the outer peripheral edge portion on the rear surface of the touch panel 14 with use of the screw 17.

Next, the outer peripheral edge portion on the rear surface of the touch panel 14 and the front surface of the pusher 21 in the coil unit 20A are bonded to each other. As a result, assembly of the movable portions is completed.

Then, the magnetic circuit unit 20B is loosely fixed to the front surface of the main body chassis 13 with use of the screws 18. Note that, a loosely fixed state of the magnetic circuit unit 20B is a state in which although the screw portion of the screw 18 is fastened to the yoke 24, the head of the screw 18 does not abut the rear surface of the main body chassis 13, and thus the magnetic circuit unit 20B can be moved by the amount of the gap between the through hole 13a and the screw 18 with respect to the main body chassis 13.

Subsequently, the other end of the spring 16 is fixed to the front surface of the main body chassis 13 with use of the screw 17.

Next, the movable portions are pushed toward the fixed portions with a predetermined load, and thereby the fit protrusion 210 of the pusher 21 and the fit recess 250 of the pole 25 are fitted to each other. As a result, the outer peripheral inclined surface 212 and the inner peripheral inclined surface 252 come into contact with each other and thereby guide each other toward the center, so that the center positions of the coil unit 20A and the magnetic circuit unit 20B are aligned with each other.

Then, the magnetic circuit unit 20B is fixed to the front surface of the main body chassis 13 with use of the screws 18. Note that, a fixed state of the magnetic circuit unit 20B is a state in which the screw portion of the screw 18 is fastened to the yoke 24, the head of the screw 18 abuts the rear surface of the main body chassis 13, and thus the magnetic circuit unit 20B cannot be moved with respect to the main body chassis 13. As a result, the magnetic gap 27 having an annular shape is held with a uniform width over the entire circumference.

Subsequently, the load pushing the movable portions is removed. As a result, the movable portions are returned to a normal position by the elastic force of the spring 16, and thereby the predetermined amount of gap is formed between the rear surface of the pusher 21 and the front surface of the pole 25.

Next, after the touch panel 14 is fitted into the opening 11a of the front design panel 11, the front design panel 11 and the rear design panel 12 that covers the main body chassis 13 from the rear are assembled.

The electronic apparatus according to the first embodiment includes the inner magnet type voice coil actuator 20, whereby the magnet 26 is disposed inside the coil 23 to reduce the size of the magnet 26 and to reduce the size of the entire electronic apparatus. In the inner magnet type voice coil actuator 20, although the magnet 26 can be made smaller in comparison with the outer magnet type voice coil actuator, the cross-sectional area of the magnet 26 is smaller by that amount, which may lead to a decrease in magnetic flux density.

However, in the electronic apparatus according to the first embodiment, even if the inner magnet type voice coil actuator 20 is adopted, positioning of the coil unit 20A with respect to the magnetic circuit unit 20B can be performed with high accuracy with use of the fit unit including the fit protrusion 210 and the fit recess 250, so that the magnetic gap 27 can be narrowed to improve the magnetic flux density. When vibrating force is F, magnetic flux density is B, coil wire length is L, and current flowing through the coil 23 is i, a relational expression $F=B*L*i$ is obtained. As is clear from the relational expression, in the electronic apparatus according to the first embodiment, larger vibrating force can be obtained by improving the magnetic flux density.

Note that, the electronic apparatus according to the first embodiment has a configuration in which the coil unit 20A is provided with the fit protrusion 210 while the magnetic circuit unit 20B is provided with the fit recess 250; however, the electronic apparatus may have a configuration in which the coil unit 20A is provided with a fit recess while the magnetic circuit unit 20B is provided with a fit protrusion. Furthermore, the electronic apparatus according to the first embodiment has a configuration in which the coil unit 20A is provided in the movable portions while the magnetic circuit unit 20B is provided in the fixed portions; however, the electronic apparatus may have a configuration in which the coil unit 20A is provided in the fixed portions while the magnetic circuit unit 20B is provided in the movable portions.

From the above, the electronic apparatus according to the first embodiment includes the touch panel 14 including the operation surface 14a on which touch operation is to be performed, the voice coil actuator 20 to apply vibrating force to the operation surface 14a in response to the touch operation, and the main body chassis 13 supporting the touch panel 14 via the spring 16. Then, the voice coil actuator 20 includes: the magnetic circuit unit 20B provided on the main body chassis 13 and including the magnetic gap 27 having an annular shape; the coil unit 20A provided on the rear surface of the touch panel 14 and including the coil 23 which has a cylindrical shape and which is provided in the magnetic gap 27; and the fit protrusion 210 and the fit recess 250 to align the center position of the coil unit 20A and the center position of the magnetic circuit unit 20B with each other by fitting the coil unit 20A and the magnetic circuit unit 20B to each other when the coil unit 20A is pushed toward the magnetic circuit unit 20B. As a result, in the electronic apparatus according to the first embodiment, positioning of the coil unit 20A with respect to the magnetic circuit unit 20B is performed, whereby the vibrating force can be obtained at a required magnetic flux density level.

Furthermore, the electronic apparatus according to the first embodiment includes: the fit protrusion 210 protruded from the coil unit 20 and including the protrusion surface 211 and the outer peripheral inclined surface 212 formed around the protrusion surface 211; and the fit recess 250 provided in such a manner as to be dented in the magnetic circuit unit 20, the fit recess 250 being to be fitted to the fit protrusion 210, the fit recess 250 including the recess surface 251 and the inner peripheral inclined surface 252 formed around the recess surface 251. Then, the diameter D1 of the protrusion surface 211 is greater than or equal to the diameter D2 of the recess surface 251, and the inclination angle of the outer peripheral inclined surface 212 and the inclination angle of the inner peripheral inclined surface 252 are identical. As a result, in the electronic apparatus according to the first embodiment, at the time of fitting of the coil unit 20A and the magnetic circuit unit 20B, the outer peripheral inclined surface 212 and the inner peripheral inclined surface 252 come into contact with each other and thereby guide each other toward the center, so that the center position of the coil unit 20A and the center position of the magnetic circuit unit 20B can be aligned with each other more reliably.

Moreover, the electronic apparatus according to the first embodiment includes the fit protrusion 210 and the fit recess 250, whereby the fit protrusion 210 fits into the fit recess 250 even when the touch operation on the operation surface 14a is performed with a load greater than or equal to a predetermined load and the touch panel 14 is pushed rearward. Thus, it is possible to restrict retreat of more than necessary in the touch panel 14. As a result, in the electronic apparatus according to the first embodiment, the voice coil actuator 20 can be prevented from being damaged.

Second Embodiment

Figure 5:
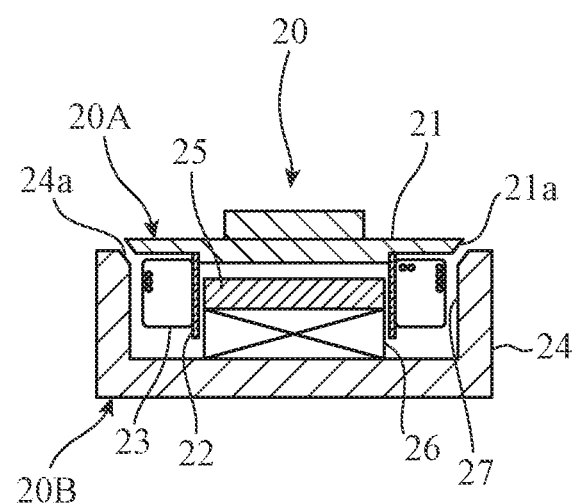
FIG. 5 is a diagram illustrating a protrusion-recess fitting structure of an electronic apparatus according to a second embodiment.

A configuration of an electronic apparatus according to a second embodiment will be described with reference to FIG. 5. FIG. 5 is a diagram illustrating a protrusion-recess fitting structure of the electronic apparatus according to the second embodiment.

The electronic apparatus according to the second embodiment illustrated in FIG. 5 has a configuration in which an outer peripheral inclined surface 21a and an inner peripheral inclined surface 24a are included in place of the fit protrusion 210 and the fit recess 250 in the electronic apparatus according to the first embodiment. The outer peripheral inclined surface 21a and the inner peripheral inclined surface 24a constitute a fit unit.

The pusher 21 includes the outer peripheral inclined surface 21a. The outer peripheral inclined surface 21a is provided on the outer peripheral side of the coil unit 20A. On the other hand, the yoke 24 includes the inner peripheral inclined surface 24a. The inner peripheral inclined surface 24a is provided on the inner peripheral side of the cylindrical portion of the yoke 24. Furthermore, an inclination angle of the outer peripheral inclined surface 21a with respect to the rear surface of the pusher 21 and an inclination angle of the inner peripheral inclined surface 24a with respect to the front end surface of the yoke 24 are the same inclination angle. Then, the outer peripheral inclined surface 21a and the inner peripheral inclined surface 24a can be fitted to each other.

As a result, in the coil unit 20A and the magnetic circuit unit 20B, at the time of fitting, the outer peripheral inclined surface 21a and the inner peripheral inclined surface 24a come into contact with each other and thereby guide each other toward the center, so that the center positions can be aligned with each other more reliably. As a result, in the electronic apparatus according to the second embodiment, positioning of the coil unit 20A with respect to the magnetic circuit unit 20B in the voice coil actuator 20 can be performed with high accuracy.

Note that, the electronic apparatus according to the second embodiment has a configuration in which the coil unit 20A is provided with the outer peripheral inclined surface 21a while the magnetic circuit unit 20B is provided with the inner peripheral inclined surface 24a; however, the electronic apparatus may have a configuration in which the coil unit 20A is provided with an inner peripheral inclined surface while the magnetic circuit unit 20B is provided with an outer peripheral inclined surface.

From the above, the electronic apparatus according to the second embodiment includes the outer peripheral inclined surface 21a provided on the outer peripheral side of the coil unit 20A, and the inner peripheral inclined surface 24a provided on the inner peripheral side of the magnetic circuit unit 20B and to be fitted to the outer peripheral inclined surface 21a. As a result, in the electronic apparatus according to the second embodiment, at the time of fitting of the coil unit 20A and the magnetic circuit unit 20B, the outer peripheral inclined surface 21a and the inner peripheral inclined surface 24a come into contact with each other and thereby guide each other toward the center, so that the center position of the coil unit 20A and the center position of the magnetic circuit unit 20B can be aligned with each other more reliably.

Note that, in the invention of the present application, within the scope of the invention, free combination of embodiments, a modification of any component of each embodiment, or omission of any component in each embodiment is possible.

INDUSTRIAL APPLICABILITY

In the electronic apparatus according to the present invention, positioning of the magnetic circuit unit with respect to the coil unit in the actuator can be performed by using the fit unit, and thus the electronic apparatus is suitable for use in an electronic apparatus in which a touch panel is supported to be capable of being vibrated.

REFERENCE SIGNS LIST

11: front design panel, 11a: opening, 12: rear design panel, 13: main body chassis, 13a: through hole, 14: touch panel, 14a: operation surface, 15: liquid crystal panel, 16: spring, 17, 18: screw, 20: voice coil actuator, 20A: coil unit, 20B: magnetic circuit unit, 21: pusher, 21a: outer peripheral inclined surface, 210: fit protrusion, 211: protrusion surface, 212: outer peripheral inclined surface, 22: coil bobbin, 23: coil, 24: yoke, 24a: inner peripheral inclined surface, 25: pole, 250: fit recess, 251: recess surface, 252: inner peripheral inclined surface, 26: magnet, 27: magnetic gap, 51: vehicle panel, 52: mounting plate, 53: vehicle fixing part

The invention claimed is:

1. An electronic apparatus comprising:
a panel including an operation surface on which touch operation is to be performed;
an actuator to apply vibrating force to the operation surface in response to the touch operation; and
a fixed member supporting the panel via an elastic member, wherein the actuator includes:
a magnetic circuit unit provided on the fixed member and including a magnetic gap having an annular shape;
a coil unit provided on a rear surface of the panel and including a coil which has a cylindrical shape and which is provided in the magnetic gap; and
a fit unit to align a center position of the magnetic circuit unit and a center position of the coil unit with each other by fitting the magnetic circuit unit and the coil unit to each other when the coil unit is pushed toward the magnetic circuit unit,
wherein the magnetic circuit unit and the coil unit each has an inclined surface, such that only the inclined surface of the magnetic circuit unit and the inclined surface of the coil unit make contact with one another when the magnetic circuit unit is at a position closest to the coil unit,
wherein the fit unit includes,
an outer peripheral inclined surface, as the inclined surface of one of the magnetic circuit unit and the coil unit, provided on an outer peripheral side of the magnetic circuit unit or the coil unit; and
an inner peripheral inclined surface, as the inclined surface of another one of the magnetic circuit unit and the coil unit, provided on an inner peripheral side of the coil unit or the magnetic circuit unit and to be fitted to the outer peripheral inclined surface, and
wherein a distance in a radial direction from the inclined surface of the magnetic circuit unit to a central axis of the coil is larger than a distance in the radial direction from an outer peripheral surface of the coil to the central axis of the coil.

* * * * *